Patented Aug. 5, 1952

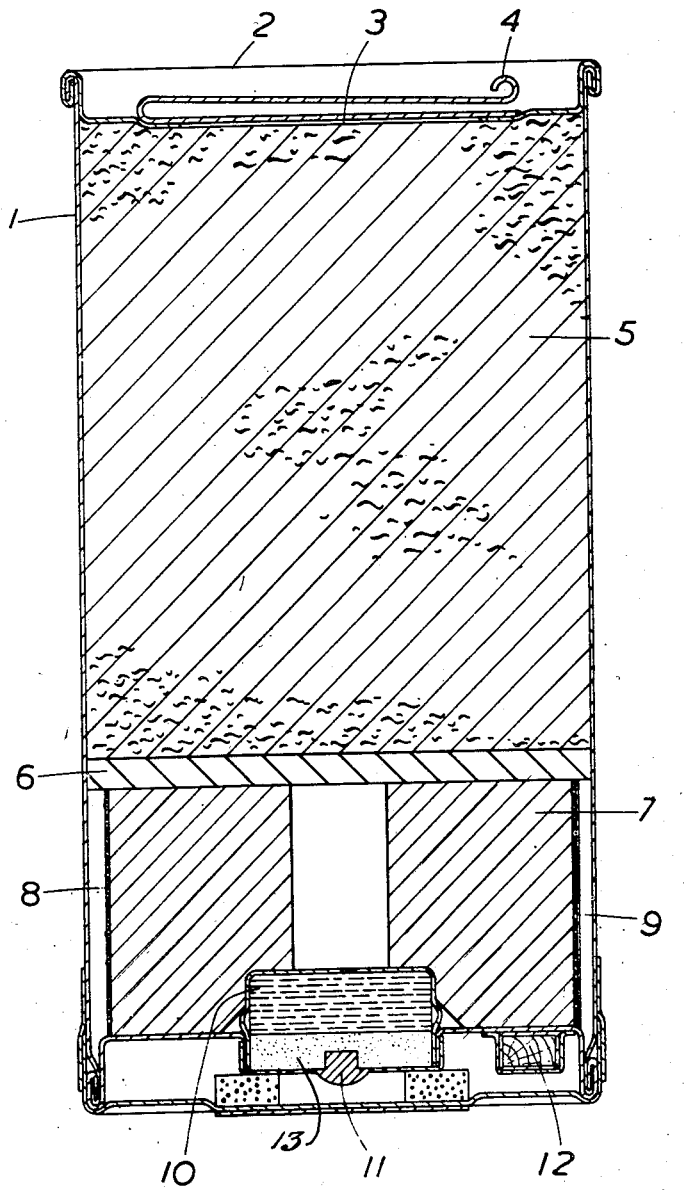

2,606,095

UNITED STATES PATENT OFFICE 2,606,095

DISPERSION OR DISSEMINATION OF INSECTICIDES, FUNGICIDES, WEED KILLERS, OR THE LIKE

Edgar William Bateman, Salisbury, and Walter Fletcher, Mirfield, England, assignors to Waeco Limited, a British company Application July 29, 1947, Serial No. 764,494
In Great Britain April 30, 1945

Section 1, Public Law 690, August 8, 1946
Patent expires April 30, 1965

2 Claims. (Cl. 21—108)

This invention relates to means for the dispersion or dissemination of organic substances employed as insecticides, fungicides, bactericides, larvicides, weed-killers or the like pest destroyers, all of which are hereinafter referred to as "pest-controlling substances."

An object of the invention is to provide a simple and inexpensive means for dispersing or disseminating vaporizable pest controlling substances, which means has a high efficiency and relatively high ratio of weight of pest controlling substance to total weight. A further object of the invention is to provide a self-contained, compact means of distributing pest controlling substances in the form of a cloud or smoke.

In co-pending application, Serial No. 706,434 is described a means for generating gas carrying the vapor of a pest-controlling substance, the means comprising a container incorporating a mixture of vaporizable pest-controlling substance and a composition capable of burning under confined conditions with evolution of gas. In use, the heat of combustion of the composition served to volatilize the contiguous pest-controlling substance and the vapor was entrained in the gas evolved and discharged from the container as a vaporized cloud.

In accordance with this invention means for generating gas carrying a vapor of a pest controlling substance comprise a vaporizable pest-controlling substance and a composition capable of burning under confined conditions with evolution of hot gas, both of which are accommodated in a container in such manner that on combustion of said composition, the pest-controlling substance will be volatilized by hot gas evolved and discharged therewith from the container.

Thus the pest-controlling substance may conveniently be supported by a carrier which is sufficiently resistant to the action of the hot gas, for example, it may be arranged in a receptacle or receptacles such as trays, troughs or the like over the surface of which flows a current of hot gas from the heater composition located in an adjacent zone. Preferably, it is absorbed or adsorbed in a porous carrier, for example kieselguhr which may be in the form of blocks. The preferred pest controlling substances are dichloro diphenyl trichlorethane (D. D. T.) and benzene hexochloride containing the gamma isomer.

Means to ignite the heater composition may also be incorporated in the container, for example some form of cap or electric fuze. Alternatively such means may be formed as a separate unit for attachment to the container at the time of use. Again some form of train, for example a Bickford fuze, or primed cambric, may be provided to facilitate ignition of the composition.

The composition capable of burning under confined conditions may be as set out in the specification of co-pending application Serial No. 706,434. For the purpose of the present invention, it is preferably employed in the form of a coherent mass or masses, granular compositions being desirably pelletted. The relative amounts of pest controlling substance and heater composition may vary within the ranges of about 45–55% pest-controlling substance to 55–45% heater composition, the proportions being by weight.

According to one convenient method of carrying the invention into effect, blocks of kieselguhr of a size approximately ⅜ to ¾ inch (50 parts by weight) are impregnated with dichloro diphenyl trichlorethane, as by treating them with the molten substance. The kieselguhr is caused to absorb its own weight of the substance in this way. The heater composition is prepared from:

| | Per cent by weight |
|---|---|
| Lactose | 50.2 |
| Potassium perchlorate | 46 |
| Paraffin wax | 3.8 |

The composition is formed into convenient size pellets and 60 parts by weight are filled into a container, preferably together with an initiator. The impregnated kieselguhr blocks are then filled in over the heater pellet or pellets. A closure for the container having a gas discharge passage is then fitted on and sealed in position. The gas discharge passage is desirably covered, for example, with shellacked cambric or the like.

In operation the initiation of the heater composition will result in evolution of hot gases, which passing over the impregnated kieselguhr blocks will volatilize the dichloro diphenyl trichlorethane, vapor of which will be discharged from the container with the gas stream. On contact with the atmosphere the vapor will condense into a particulate cloud, as described in the specification referred to above.

In order that the invention may be more clearly understood, reference is made to the accompanying drawing, which illustrates diagrammatically and by way of example, a sectional elevation of preferred means for carrying the invention into practical effect and in which:

The reference numeral 1 denotes a cylindrical container provided with a top closure 2 containing an emission slit 3 closed by means of a tearoff strip 4 made of shellacked cambric. The space between top closure 2 and the felt disc 6 is occupied by the pest controlling substance 5, consisting of blocks of kieselguhr on which is absorbed D. D. T. Below the felt disc 6 is located an annular pellet 7 of lactose-potassium perchlorate-wax heater composition, the outer surface of said pellet being wrapped or coated with non-inflammable material 8. Between the outside of the pellet 7 and the wall of container 1 an annular space 9 is left. Ignition means for heater pellet 7 consists of the match-head 11 embedded in ignition composition 13 adjacent the primer composition 10.

Ignition is effected by means of the wrapped detachable striker stick 12, to one surface of which is attached a strip of emery cloth or glass paper.

It will be noted from the drawing that the ignition composition 13, primer composition 10 and match-head 11 comprise an encased unit which is disposed in the end wall of the container.

On ignition of the heater pellet 7, the hot gases therefrom pass upward through the D. D. T. kieselguhr zone 5, expelling the insecticide in the form of a vaporized cloud of aerosol through the emission slit 3.

We claim:

1. An apparatus for generating and emitting a gas containing a vapor of a pest-controlling substance, which comprises, a tubular container with a closed end, an imperforate side wall and an end having an outlet opening therein, detachable closure means for said opening, porous partition means dividing said container into two zones, a porous medium substantially filling the zone between said partition and said end having said outlet opening therein, a pest-controlling substance carried by said porous medium, an annular shaped mass of a composition capable of burning under confined conditions to evolve the hot gas, said mass being disposed in said container between said partition and said closed end, the overall diameter of said mass being less than the interior diameter of said container so as to provide a peripheral channel for passage of hot gases to said partition and thence to said first zone, and an ignition composition and primer composition unit within said container adjacent said mass, said unit having igniting means extending through a wall of the container.

2. An apparatus for generating and emitting a gas containing a vapor of a pest-controlling substance, which comprises, a tubular container with a closed end wall, an imperforate side wall and a second end wall having an outlet slit opening therein, detachable closure means for said slit, porous partition means dividing said container into two zones, a porous medium substantially filling the zone between said partition and said second end wall, a pest-controlling substance carried by said porous medium, an annular shaped mass of a composition capable of burning under confined conditions to evolve a hot gas, said mass being disposed in said container in the other zone between said partition and said closed end wall, the overall diameter of said mass being less than the interior diameter of said container so as to provide a peripheral channel for passage of hot gases to said partition and thence to said first zone, an ignition composition and primer composition unit within said container adjacent said mass, said unit having igniting means extending through a wall of the container, said annular shaped mass and said ignition and primer composition unit being coaxially disposed on the longitudinal axis of the container, and said ignition and primer unit extending partially within an annular cut-out in said mass.

EDGAR WILLIAM BATEMAN.
WALTER FLETCHER.

REFERENCES CITED

The following references are of record in the file of this patent:

UNITED STATES PATENTS

| Number | Name | Date |
|---|---|---|
| 680,384 | Kingzett | Aug. 13, 1901 |
| 860,450 | Dolge | July 16, 1907 |
| 1,003,393 | Bauer | Sept. 12, 1911 |
| 1,634,354 | Gross et al. | July 5, 1927 |
| 2,071,171 | McConnell | Feb. 16, 1937 |
| 2,132,786 | Hockenyos | Oct. 11, 1938 |
| 2,385,636 | McLain et al. | Sept. 25, 1945 |

FOREIGN PATENTS

| Number | Country | Date |
|---|---|---|
| 590,293 | Great Britain | July 14, 1947 |